United States Patent [19]

Hagström et al.

[11] Patent Number: 5,613,217
[45] Date of Patent: Mar. 18, 1997

[54] TRANSCEIVER SITE SELECTION A CELLULAR COMMUNICATIONS SYSTEM

[75] Inventors: Ulf E. Hagström; Magnus B. Isaksson, both of Täby, Sweden

[73] Assignee: Telefonaktiebolaget LM Ericsson, Stockholm, Sweden

[21] Appl. No.: 433,097

[22] Filed: May 3, 1995

[51] Int. Cl.$^6$ ..................................... H04B 17/00
[52] U.S. Cl. ..................... 455/67.1; 455/33.1; 455/54.1
[58] Field of Search .............................. 455/33.1, 54.1, 455/56.1, 67.1, 67.3, 67.4, 89, 95, 226.2, 226.1; 379/58, 59, 60, 22, 27, 29, 34

[56] References Cited

FOREIGN PATENT DOCUMENTS

| | | |
|---|---|---|
| 2830589 | 7/1990 | Australia . |
| 0292182A2 | 11/1988 | European Pat. Off. . |
| 0344624A2 | 12/1989 | European Pat. Off. . |
| 0431956A2 | 6/1991 | European Pat. Off. . |
| 2232850 | 12/1990 | United Kingdom . |
| WO91/15904 | 10/1991 | WIPO . |
| WO92/07429 | 4/1992 | WIPO . |
| WO93/15569 | 8/1993 | WIPO . |
| WO94/00932 | 1/1994 | WIPO . |
| WO94/05098 | 3/1994 | WIPO . |
| WO94/06222 | 3/1994 | WIPO . |
| WO95/09513 | 4/1995 | WIPO . |

OTHER PUBLICATIONS

Advertisement for Smith Myers Cellular System Simulator CSS2100, published 1993, 1994.
Advertisement for Smith Myers Cellular System Monitor CSM8800, publication date unknown.
D. Yekta & F. Howat, "Product Review: Smith Myers CSM-8800 Cellular Service Monitor", Cellular Business, Dec. 1993.
Patent Abstract for Soviet Union Patent Document No. SU 1185–626–A, published in 1986, England.
Advertisement for Smith Myers Cellular System Monitor CSM8000, publication date unknown.
Advertisement for Smith Meyers ART–775 Cellular Test Instrument.

Primary Examiner—Reinhard J. Eisenzopf
Assistant Examiner—Marsha D. Banks-Harold
Attorney, Agent, or Firm—Burns, Doane, Swecker & Mathis, L.L.P.

[57] ABSTRACT

In a cellular communications system having a plurality of cells, each cell being served by at least one of a plurality of existing base stations, a method of determining a location for a new micro base station antenna involves first providing a test antenna at a test location in one of the cells. Then, for a predetermined time period, a monitoring procedure is performed to assess how many mobile stations are close enough to the test location that they would be served by a micro cell having a base transceiver antenna at the test location. The monitoring procedure involves, in the test antenna, receiving an uplink access attempt signal that is transmitted from a mobile station to an intended one of the existing base stations. Then, signal strength of the received uplink access attempt signal is measured and compared to a predetermined threshold level. If the measured signal strength is greater than the predetermined threshold level, then a count value is incremented. After performing the monitoring procedure, the count value is compared to a predetermined count value. If the count value is higher than the predetermined count value, then the new micro base station is established at the test location. In an alternative embodiment of the invention, the monitoring procedure is performed at several test locations. The new micro base station is then established at that one of the test locations that has the highest count value.

4 Claims, 5 Drawing Sheets

TRANSCEIVER SITE SELECTION A CELLULAR COMMUNICATIONS SYSTEM

BACKGROUND

The present invention relates to a cellular communications system, and more particularly to the selection of a transceiver site in a cellular communications system.

Cellular communications systems, such as those defined by the AMPS and GSM standards, are well known in the art. Such systems are characterized by the division of a geographical area into a number of cell sites, each served by a radio base station (RBS). FIG. 1. illustrates a portion of one such system. Any mobile station (MS) located in one of the cells may be in radio communication with the RBS, which in turn is communicatively coupled to a mobile system switching center (MSC) by, for example, an electrical or optical fiber cable. The MSC may establish connections between several MSs located within the cellular communications system and may also establish connections to entities outside the system by means of, for example, a link with a public switched telephone network (PSTN). These concepts are well known, and need not be described here in greater detail.

In order to avoid radio interference between nearby cells (called "cochannel interference"), such systems are designed to avoid using the same radio channels in nearby cells. However, the same channel may be used by different cells if they are sufficiently far apart from one another so as not to significantly interfere with each other. The distance between two such cells is called the "reuse distance."

Traditionally, cellular systems have been designed for telephones that are installed in cars. Each cell of such a system covers an area of approximately one square kilometer or more. The enormous popularity of cellular telephony and the introduction of hand held portable cellular telephones has now increased the demand for capacity of the system and for radio coverage indoors, and in other areas accessible to pedestrians.

As a solution to the problem of providing increased traffic handling capacity in cellular communications systems, smaller cells, referred to as micro or pico cells, have been provided. These smaller cells permit channels to be reused with greater frequency (i.e., with a smaller reuse distance), thus providing a mechanism for permitting the system as a whole to carry more traffic.

Micro/pico cells have been used to provide system coverage both outdoors and indoors. For example, it is advantageous to locate micro or pico cells in tunnels and the like. The fact that many small cells are used increases the cell planning complexity. The transceiver antennas must, in order to limit the cell size, be mounted close to the ground. However, this causes the radio propagation to be affected by stationary and movable obstacles, such as buildings, walls, doors and trees.

Another problem that occurs when designing a system to include small cells, is knowing exactly where the subscribers are most likely to be located while using their cellular telephones. Installing cellular radio equipment entails a substantial cost associated with the cellular radio equipment, the provision of electric and transmission facilities, etc. Therefore, it is of great economic interest to make an optimal choice when selecting the site for the base transceiver antenna. The site location must be optimal both with respect to radio propagation aspects as well as to traffic demand aspects (i.e., to ensure that the base transceiver antenna is situated at a location that will permit it to handle the largest number of calls). This is conventionally performed by making more or less clever guesses. However, due to the micro/pico cell's much smaller coverage area when compared to that of a "regular" cell, its performance is much more sensitive to the location of the base transceiver antenna. Thus, an error in determining a location for this antenna may have a substantial impact on micro/pico cell performance.

Various types of cellular communications system test equipment are known, but most do not address the problem of finding the optimal location of a base station site that will maximize the number of calls that will be handled by the new cell site. For example, the European patent document EP, A2, 0431956 discloses a system and method of evaluating the radio coverage of a geographic area serviced by a digital cellular radio telephone communications system. During operation, the position of at least one mobile subscriber within the geographic area is located when a call is received by a base station. The base station monitors the signal quality of the call and collects information relevant to the performance of the communications system. Location data and corresponding signal quality data are passed from the base station to an evaluating tool within the operation and maintenance center, where the characteristics of the radio coverage is presented. With this information, the system operator can diagnose coverage deficiencies and take the necessary corrective action.

A PCT application, WO, A1, 94/00932 describes devices for testing the voice transmission quality in a cellular communications system. A test set, programmed to monitor voice channels, is located within a cell site where it calls a responder connected to the switch of the mobile telephone switching office (MSTO) that serves the cell. A local switch with a responder at the base station may be provided to facilitate pinpointing any problems between the cell station trunk line and the wireless communication path.

Another PCT application, WO, A1, 91/15904 discloses base station transceiver equipment, for use in a cellular radio telephone system, that measures a parameter (e.g., timing, signal strength) of a mobile transceiver and instructs the mobile to adjust that parameter of its signals. A diagnostic subsystem or test mobile is provided in proximity to the base station transceiver equipment. The test mobile can change the parameter of its transmissions to simulate relative distance from the base station transceiver equipment for testing that the base station equipment issues the correct command.

An abstract of a patent document from the former Soviet Union, SU, A, 1185-626, outlines a radio station tester for monitoring the transmitted power level from a radio transmitter. The tester can be used for checking the response of a moving radio station to a calibrated level.

Yet another PCT application, WO, A2, 92,07429 describes an air interface monitoring unit with the capability of recording various messages and operational parameters. A unit having similar features is described in D. Yekta and F. Howat, "Product Review: Smith Myers CSM-8800 Cellular Service Monitor" *Cellular Business,* December 1993. However, the data collected by this unit does not tell a user how many MSs would utilize a hypothesized new micro/pico cell situated at the location of the air interface monitoring unit, because the unit does not discriminate between data collected from MSs that are close to the unit, and data collected from MSs that are far away from the unit. For purposes of planning a new micro/pico cell site, it is important to know how many MSs are in close enough vicinity to actually use the proposed site.

An advertisement for a Smith Myers Cellular System Simulator CSS2100 describes a unit that has the ability to simulate a cellular base station. That is, the unit can transmit signals to mobile cellular phones, whereby the mobile responds as if connected to the real cellular system and will obey and valid commands the unit sends. In particular, the CSS2100 can request all mobiles on a particular network in the immediate area to register, giving the user the number of mobiles in the immediate area. According to the advertisement, this unit is suitable for investigating the number of subscribers in a particular geographic area for the purpose of helping to decide as to whether another cell site is required in that area.

The CSS2100 has the drawback, however, in that by actively transmitting "dummy" control signals to MSs in order to get them to register, it may cause interference with the normal functioning of that cell.

Thus, there is the need to provide a mechanism for passively determining whether a proposed cell-site is the best for placement of a new base transceiver antenna.

SUMMARY

It is therefore an object of the present invention to provide a method and apparatus for determining a suitable location for a new micro/pico base transceiver antenna.

It is a further object of the present invention to provide such a method and apparatus that operates passively, so as not to cause any interference with the normal operation of the cellular communications system.

In accordance with one aspect of the present invention, the foregoing and other objects are achieved in a cellular communications system having a plurality of cells, each cell being served by at least one of a plurality of existing base stations, wherein a method of determining a location for a new micro base station antenna involves first providing a test antenna at a test location in one of the cells. Then, for a predetermined time period, a monitoring procedure is performed to assess how many mobile stations are close enough to the test location that they would be served by a micro cell having a base transceiver antenna at the test location. The monitoring procedure involves, in the test antenna, receiving an uplink access attempt signal that is transmitted from a mobile station to an intended one of the existing base stations. Then, signal strength of the received uplink access attempt signal is measured and compared to a predetermined threshold level. The predetermined threshold level is preferably set at a level representing the minimum signal strength expected to be received from a mobile station located within a proposed micro cell having a base transceiver antenna situated at the test location.

If the measured signal strength is greater than the predetermined threshold level, then a count value is incremented. In one embodiment of the invention, after performing the monitoring procedure, the count value is compared to a predetermined count value. If the count value is higher than the predetermined count value, then the new micro base station is established at the test location. The significance of the count value is that it represents a minimum amount of traffic that would be required within the predetermined time period to warrant establishment of a micro cell having a base transceiver antenna situated at the test location.

In an alternative embodiment of the invention, the monitoring procedure is performed at several test locations. The new micro base station is then established at that one of the test locations that has the highest count value, since this is the location that experienced the most nearby traffic.

In another embodiment of the invention, the comparison of measured signal strength with the predetermined threshold signal strength value is not performed during the data measurement phase. Instead, measurement values are stored in a memory at this time. After all of the data has been collected, it is analyzed as described above, including comparing measured signal strength values to the predetermined threshold signal strength value.

BRIEF DESCRIPTION OF THE DRAWINGS

The objects and advantages of the invention will be understood by reading the following detailed description in conjunction with the drawings in which.

DETAILED DESCRIPTION

Figure 1:
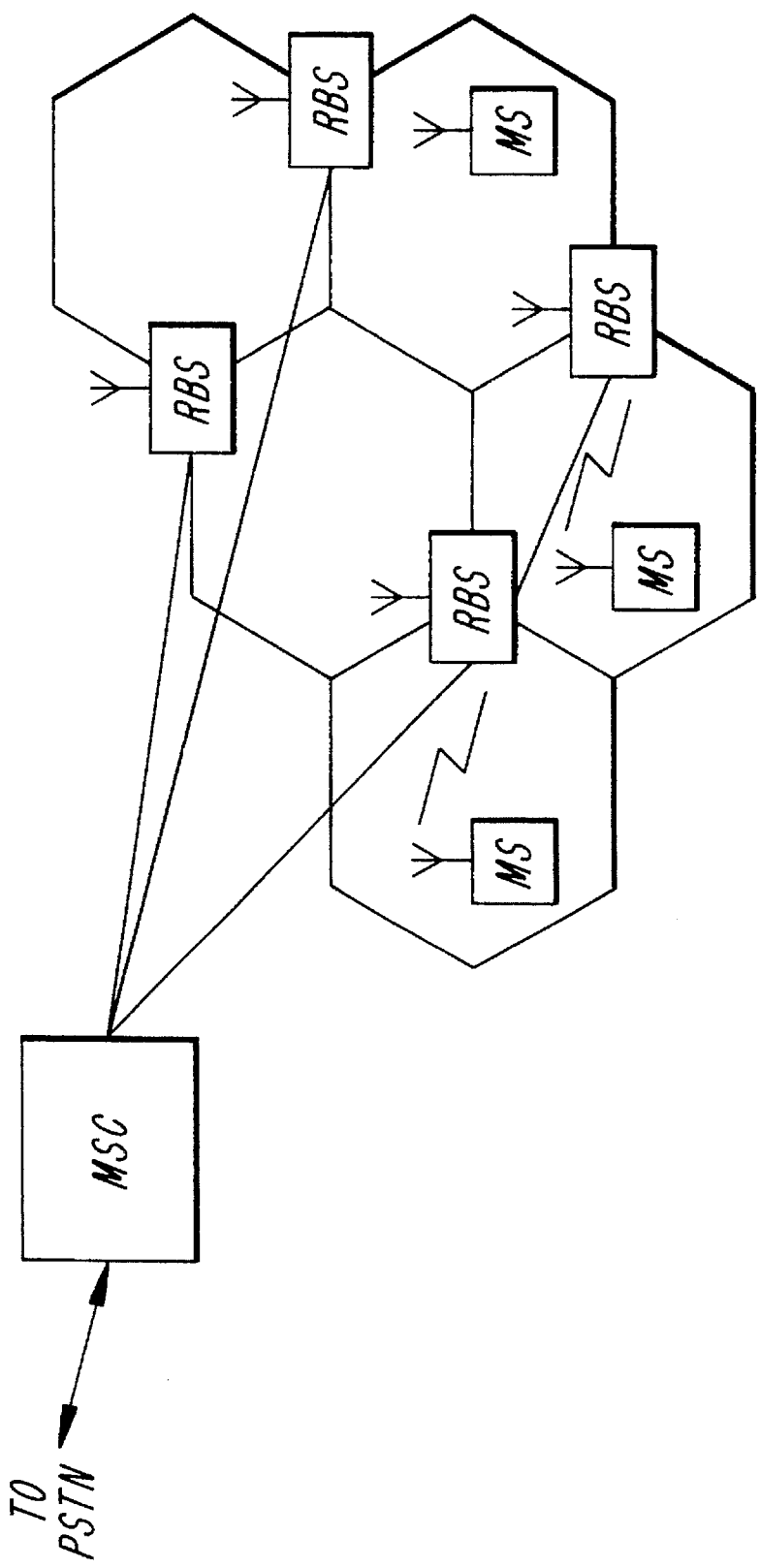
FIG. 1 is a block diagram of a portion of a conventional cellular communications system.

The various features of the invention will now be described with respect to the figures, in which like parts are identified with the same reference characters.

Figure 2A:
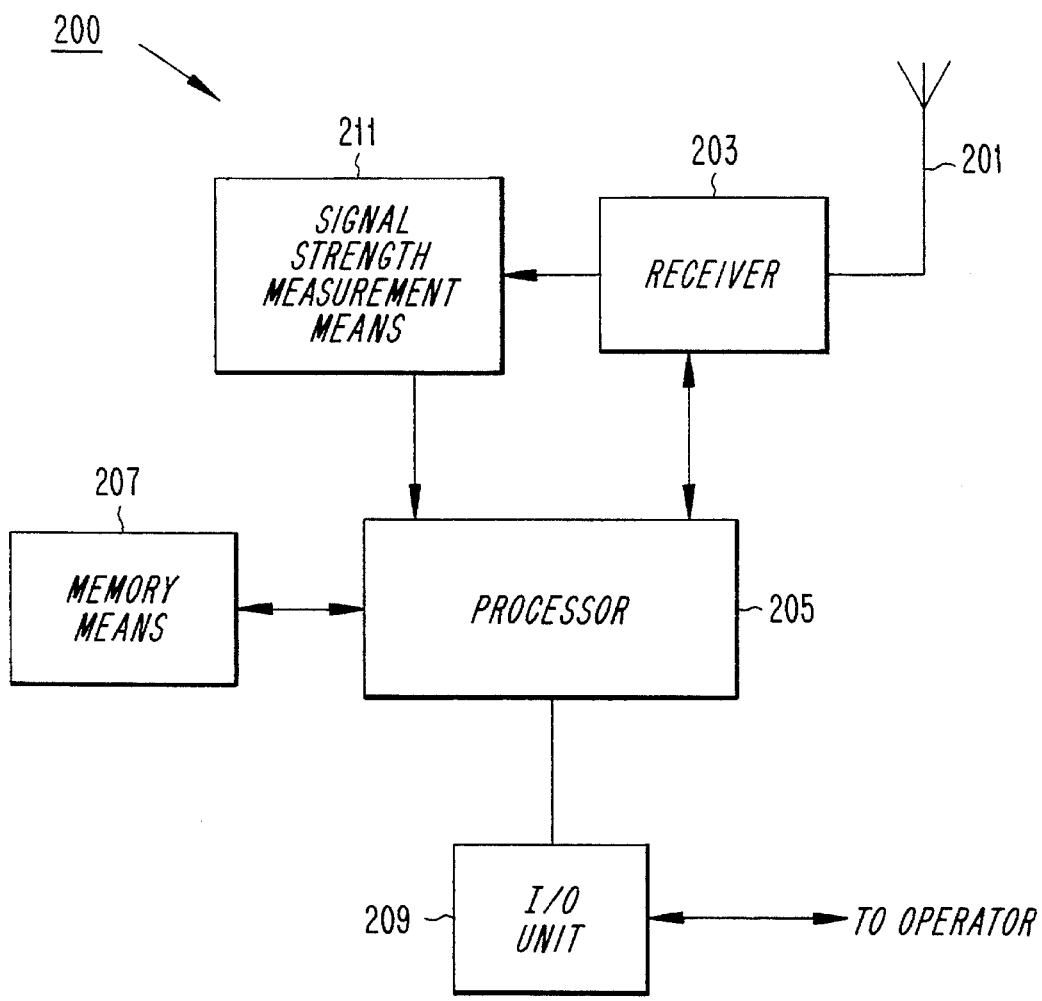
FIGS. 2A and 2B are block diagrams of test equipment for assessing the suitability of a proposed transceiver site in accordance with the present invention.

Referring to FIG. 2A, a block diagram of a test unit 200 for determining the suitability of a test site for use as a new base transceiver antenna site in accordance with the present invention is shown. The test unit 200 includes an antenna 201 coupled to a receiver 203. The operation of the receiver 203 (i.e., what frequencies to listen to, etc.) is controlled by a processor 205. The processor 205 is also coupled to an output of the receiver 203, and is configured to analyze the nature of a communication conveyed by the received signal. The test unit 200 further includes a signal strength measurement unit 211 coupled to the receiver 203 and to the processor 205, and may also include memory means 207 (e.g., random access memory, or a disk storage unit) coupled to the processor 205 to allow collected data to be stored for later use. The test unit 200 still further preferably includes an input/output (I/O) unit 209 to allow an operator to input commands and data operands, and to permit the operator to obtain the empirical results of a test.

Figure 3:
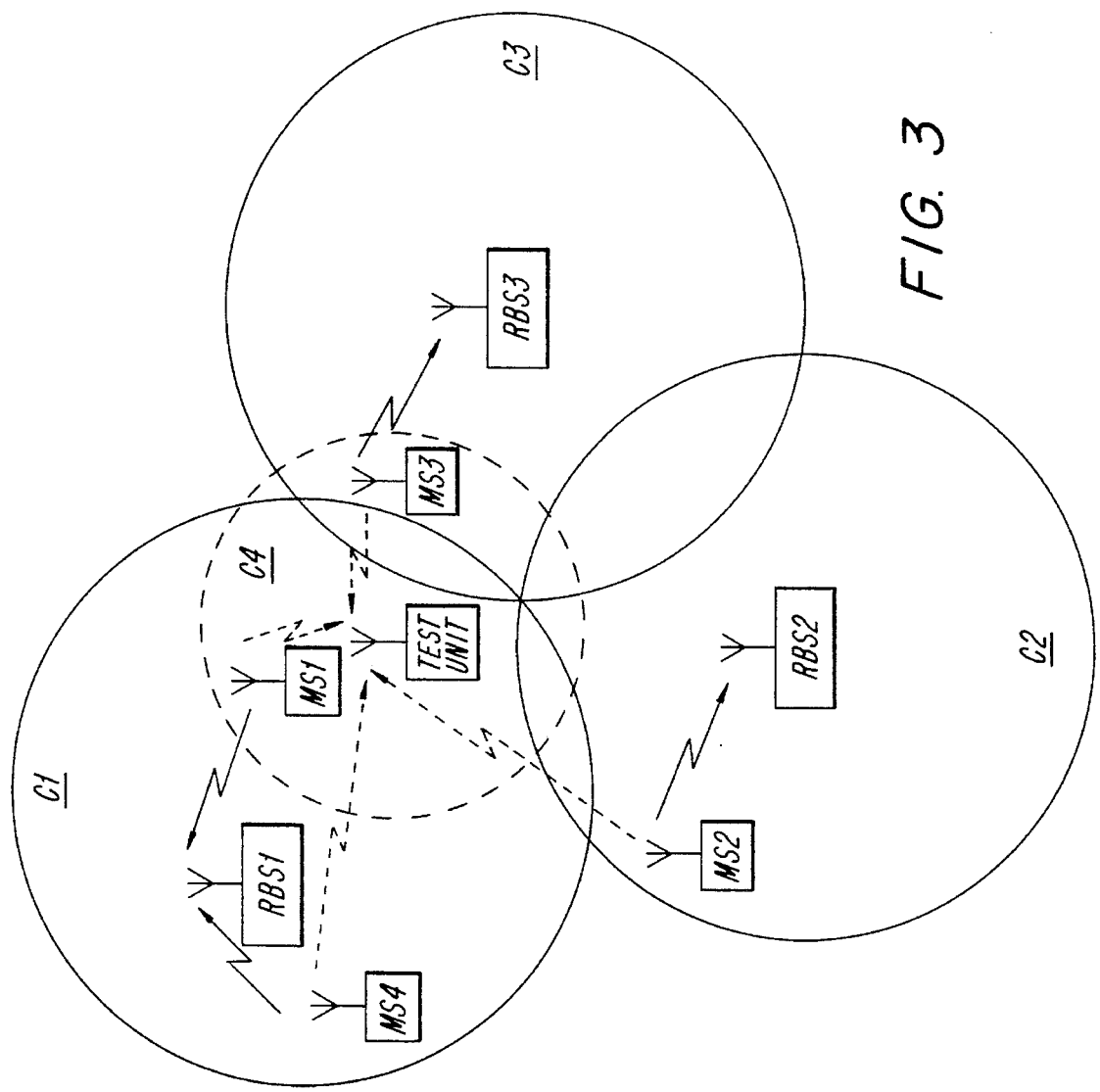
FIG. 3 is a block diagram that illustrates the use of the test equipment in a cellular communications system in accordance with the present invention.
Figure 4:
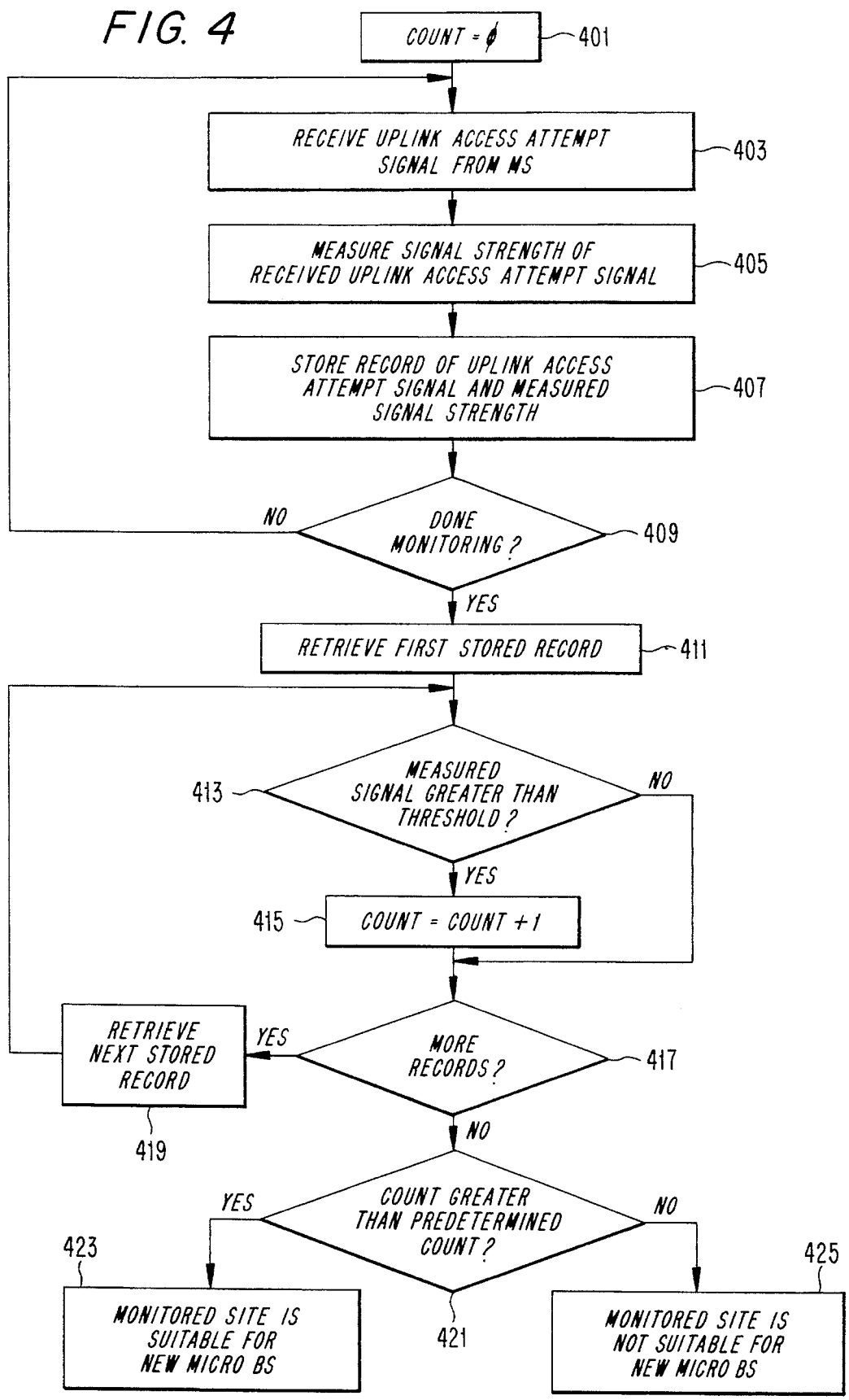
FIG. 4 is a flow chart of steps to be performed in accordance with one embodiment of the invention.

The operation of the inventive test unit 200 will now be described with reference to FIGS. 3 and 4. Three cells C1, C2, C3 in a cellular communications system are shown. The cells are served, respectively, by RBS1, RBS2 and RBS3. It is presumed, for the sake of this example, that it is proposed to add a new micro cell C4 to the system. The test unit 200 has been placed somewhere near the periphery of cell C1 in order to determine whether this would be a good spot for the proposed new base transceiver antenna. Whether this is a good location will depend, at least in part, on how many MSs there usually are within the boundaries of the proposed new micro cell C4.

The test unit 200 works by listening to one or more of the uplink (i.e., from MS to RBS) control channel (i.e., access channel) frequencies. As illustrated in FIG. 3, three uplink control channels may be monitored: one associated with each of RBS1, RBS2 and RBS3. Information about which frequencies to monitor can be manually set by an operator. Alternatively, the test unit 200 can be designed to automatically determine which frequencies to monitor by scanning all downlink (i.e., from RBS to MS) frequencies used for control channel signalling, and then selecting the one(s) that is (are) received with the highest signal strength.

When the test unit 200 listens to one or more of the uplink frequencies used for control channel signalling, it will detect access messages from mobile stations (e.g., MS1, MS2, MS3, MS4) that are attempting to access one of the nearby base stations RBS1, RBS2, RBS3 (step 403). An access attempt from a mobile station could, for example, be caused by the mobile station setting up a call or by the mobile station responding to a paging message from the base station when a call is being set up to the mobile station. Such a procedure is described, for example, in U.S. Pat. No. 5,357,559.

In accordance with the invention, when the test unit 200 detects access messages, it records (e.g., into the memory means 207) the associated received signal strength (steps 405–407). In a preferred embodiment of the invention, the test unit 200 also records the date, time and location of the measurement.

Figure 2B:
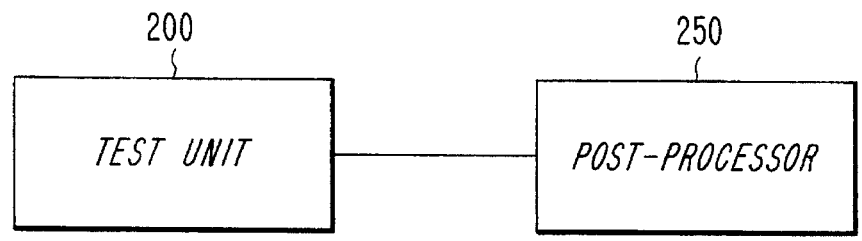

After a predetermined period of measurement (step 409), such as a day or a week, the recorded access events are applied to a post-processing tool 250 (see FIG. 2B). The post-processing tool 250 may be a separate unit as depicted in FIG. 2B, or it may alternatively be, for example, the test unit's own processor 205 running post-processing software. In the following discussion, reference to the post-processing tool 250 should be considered to refer to any of the possible embodiments.

The purpose of the post-processing tool 250 is to apply one or more signal strength thresholds to classify the access events. The classification of access events could, for example, be such that access messages having associated received signal strengths greater than the predetermined signal strength threshold represent those call attempts that would have been generated to a micro base station had it been placed in the same location as the test unit 200. For example, referring to FIG. 3, the signal strength threshold can be set at a level that would be expected to be received only by mobile stations located within the proposed new micro cell C4. Thus, only those access attempts from mobile stations MS1 and MS3 would have signal strengths strong enough to be classified as potential micro base station call attempts. The mobile stations MS2 and MS4 are too far away from the test unit 200 to have signal strengths at or above the predetermined threshold level, and would therefore not be classified in this manner.

The post-processing tool 250 then counts the number of access attempts that are classified as potential micro base station call attempts (steps 401 and 411–419). A high count value may indicate that a micro base station should be installed at the corresponding location (steps 421 and 423). A count lower than a predetermined count value may indicate that the test site is not suitable for placement of a new micro base station (steps 421 and 425). Alternative locations for the test unit 200 can also be evaluated in the same way to find the optimum location of a micro base station, based on the number of call attempts or the traffic carried (steps depicted in FIG. 4 would be repeated for a new test site, and count values from respective sites would be compared with one another).

Figure 5:
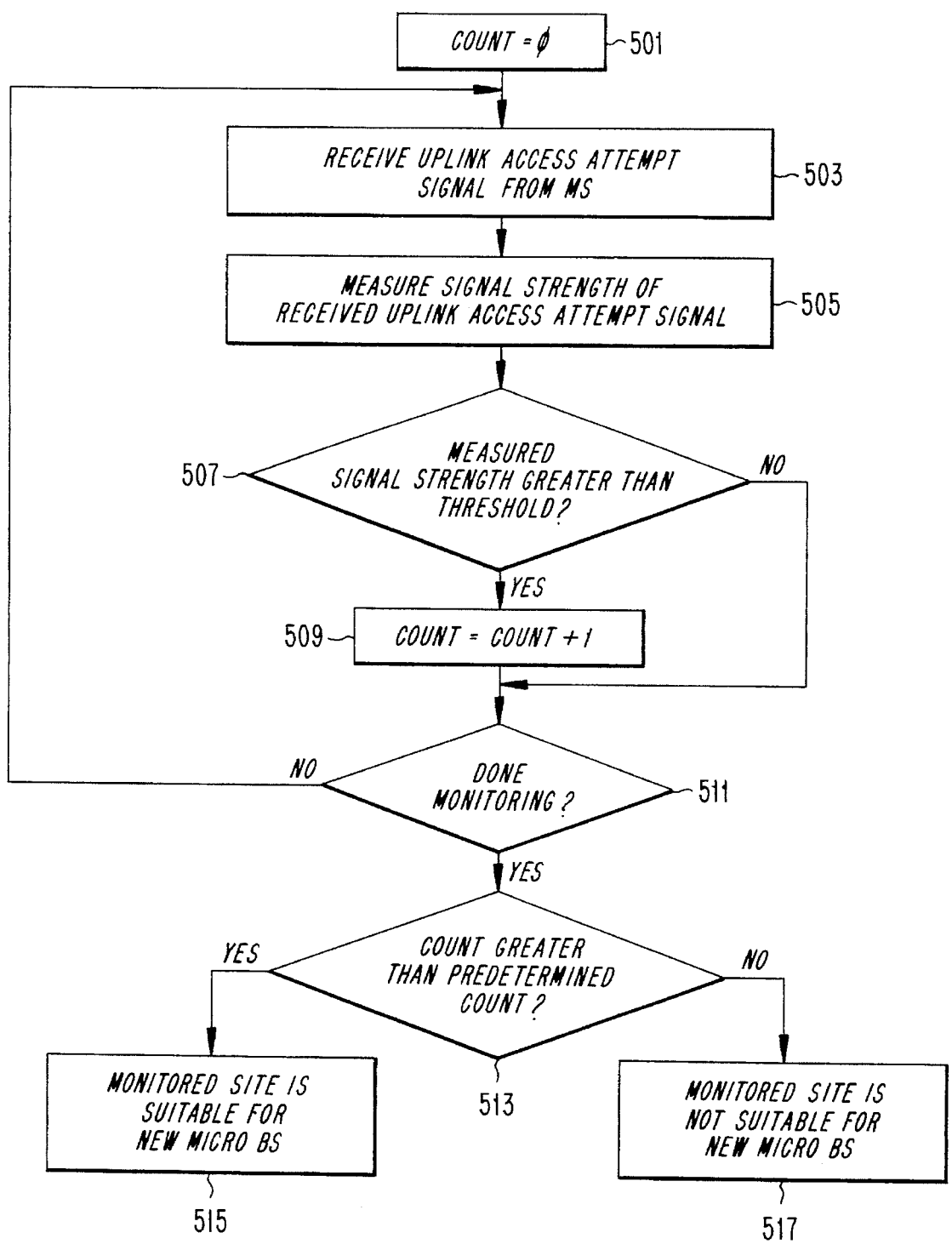
FIG. 5 is a flow chart of steps to be performed in accordance with another embodiment of the invention.

In an alternative embodiment of the invention, which is illustrated in FIG. 5, the test processor 200 does not record every detected access message along with the associated received signal strength. Instead, the received signal strength associated with the detected access message is first compared to one or more signal strength thresholds (step 507). If the measured signal strength is greater than the predetermined threshold level, then the processor 205 increments a count value that may, for example, be stored in the memory means 207 (steps 501 and 509). After performing the monitoring procedure for a predetermined time period at the test location (step 511), the count value is then compared to a predetermined count value (step 513). If the count value is higher than the predetermined count value, then the new micro base station may be established at the test location (step 515). Otherwise, the monitored test site may be unsuitable for placement of a new micro base station (step 517).

This alternative embodiment has a drawback, compared to the embodiment described above with reference to FIG. 4, in that the signal strength threshold value (step 507) must be determined before any testing is performed. This does not permit one to vary threshold values to see how results are affected. By contrast, with post-processing as described above with reference to FIG. 4, one may run the post-processing tool 250 a number of times using different signal strength threshold values. Nonetheless, the embodiment of the invention that is depicted in FIG. 5 may be used to achieve acceptable results.

The invention offers a very effective cell planning aid for finding the optimal location (from the point of view of maximizing the number of calls) particularly for, but not limited to, a micro base station antenna. Since the micro and pico cells of modern cellular radio systems require low positioned antennas and low power base stations, finding the optimal location of a cell site is more important than ever.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a cellular communications system having a plurality of cells, each cell being served by at least one of a plurality of existing base stations, a method of determining a location for a new micro base station antenna comprising the steps of:

providing a test antenna at a test location in one of the cells;

for a predetermined time period, performing a monitoring procedure comprising the steps of:

in the test antenna, receiving an uplink access attempt signal that is transmitted from a mobile station to an intended one of the existing base stations;

measuring signal strength of the received uplink access attempt signal;

comparing the measured signal strength to a predetermined threshold level; and if the measured signal strength is greater than the predetermined threshold level, then incrementing a count value; and after performing the monitoring procedure, comparing the count value to a predetermined count value and if the count value is higher than the predetermined count value, then establishing the new micro base station at the test location.

2. In a cellular communications system having a plurality of cells, each cell being served by at least one of a plurality of existing base stations, a method of determining a location for a new micro base station antenna comprising the steps of:

determining a plurality of test locations, each test location located in at least one of the cells;

at each one of the test locations:
 providing a test antenna;
 for a predetermined time period, performing a monitoring procedure comprising the steps of:
  in the test antenna, receiving an uplink access attempt signal that is transmitted from a mobile station to an intended one of the existing base stations;
  measuring signal strength of the received uplink access attempt signal;
  comparing the measured signal strength to a predetermined threshold level; and
  if the measured signal strength is greater than the predetermined threshold level, then incrementing a count value; and after performing the monitoring procedure at each of the test locations, comparing the respective count values to one another, determining which of the test locations has the highest count value, and establishing the new micro base station at that test location having the highest count value.

3. In a cellular communications system having a plurality of cells, each cell being served by at least one of a plurality of existing base stations, a method of determining a location for a new micro base station antenna comprising the steps of:

providing a test antenna at a test location in one of the cells;

for a predetermined time period, performing a monitoring procedure comprising the steps of:
 in the test antenna, receiving an uplink access attempt signal that is transmitted from a mobile station to an intended one of the existing base stations;
 measuring signal strength of the received uplink access attempt signal; and
 storing a record of the uplink access attempt and the measured signal strength in a memory;

after performing the monitoring procedure, analyzing the records stored in the memory by, for each of the records, comparing the measured signal strength to a predetermined threshold level, and if the measured signal strength is greater than the predetermined threshold level, then incrementing a count value; and after analyzing the records stored in the memory, if the count value is higher than a predetermined count value, then establishing the new micro base station at the test location.

4. In a cellular communications system having a plurality of cells, each cell being served by at least one of a plurality of existing base stations, a method of determining a location for a new micro base station antenna comprising the steps of:

determining a plurality of test locations, each test location located in at least one of the cells;

at each one of the test locations:
 providing a test antenna;
 for a predetermined time period, performing a monitoring procedure comprising the steps of:
  in the test antenna, receiving an uplink access attempt signal that is transmitted from a mobile station to an intended one of the existing base stations;
  measuring signal strength of the received uplink access attempt signal; and
  storing a record of the uplink access attempt and the measured signal strength in a memory;

after performing the monitoring procedure at each of the test locations, analyzing the records stored in the memory for each of the test locations by, for each of the records, comparing the measured signal strength to a predetermined threshold level, and if the measured signal strength is greater than the predetermined threshold level, then incrementing a count value associated with the test location; and;

after analyzing the records stored in the memory for each of the test locations, comparing the respective count values to one another, determining which of the test locations has the highest count value, and then establishing the new micro base station at that test location having the highest count value.

* * * * *